3,328,453
FLUOROFORMAL AND FLUORTHIOFORMAL COMPOUNDS AND PRODUCTION THEREOF

Karl O. Christe and Attila E. Pavlath, Berkeley, Calif., assignors to Stauffer Chemical Company, New York, N.Y., a corporation of Delaware
No Drawing. Filed Aug. 7, 1963, Ser. No. 300,657
9 Claims. (Cl. 260—455)

This invention relates to a new and novel method for preparing fluorine containing aromatic compounds. The nature of the aromatic nucleus may be monocyclic or polycyclic and may be either unsubstituted or in addition to the fluoroformyl or fluorothiolformyl groups it may have such groups present as halogen, alkyl, haloalkyl, alkoxy, haloalkoxy and the like. In particular, it refers to a new process for preparing the novel classes of fluorinated aromatic compounds, aromatic fluoroformates and aromatic fluorothiolformates, and to new species of these classes such as phenylfluoroformate, phenylfluorothiolformate, p-phenylene bisfluoroformate, p-tolylfluoroformate, 1-naphthylfluoroformate, s-phenenyltrisfluoroformate, and the like.

The arylchloroformates, which are well known, have been described frequently in the literature. Especially, the preparation and chemical properties of phenylchloroformate have been studied and described in the literature. The arylfluoroformates heretofore were unknown except for phenylfluoroformate. But the novel properties of these compounds permits their use in a variety of applications. For example, they can be used as intermediates in preparing the corresponding fluoro aromatic compounds as shown in our co-pending application Ser. No. 454,215 filed May 7, 1965, now U.S. Patent No. 3,283,018 which is a continuation-in-part application of Ser. No. 300,666 filed on even date herewith, now abandoned, as intermediates for organic compounds useful in agricultural chemicals, pharmaceuticals, as plasticizers, and in resins. In general, according to U.S. Patent No. 3,283,018, by a process of thermal decomposition of arylfluoroformates or arylfluorothiolformates under substantially anhydrous conditions at temperatures between about 350° C. and 900° C., the corresponding nuclearly fluorinated aromatic compounds may be prepared.

The arylchloroformates, especially phenylchloroformate, have been prepared and their properties studied. There are three general methods for the preparation of phenylchloroformate described, all of which differ sufficiently from the present invention to deem it novel. The only reported preparation of phenylfluoroformate was by Emeleus and Wood, J. Chem. Soc. 1948, 2183–8. In this paper phenylfluoroformate was described and its preparation was carried out by reacting carbonyl fluoride with phenol in an autoclave. The yield of phenylfluoroformate was not very high because of excessive diphenylcarbonate formation in the procedure used.

The methods for the preparation of phenylchloroformate and phenylfluoroformate are not uniformly applicable for preparing the arylfluoroformates of this invention. The methods of the prior art are frequently difficult to control as to the desired product and arylcarbonate formation is the resulting undesirable product.

The above information is equally applicable to phenylchlorothiolformate, except that phenylfluorothiolformate is not mentioned in the literature. But it can be stated that diaryldithiolcarbonate would be the undesired by-product formed in any analogous reaction.

A general object of the present invention is, therefore, to provide a new process for preparing arylfluoroformates and arylfluorothiolformates.

A more specific object is a process for the preparation of such fluoroformates and fluorothiolformates in high yield and with a minimum of carbonate and dithiolcarbonate formation.

Pursuant to the above mentioned and yet further objects, it has been found that aromatic fluoroformates and aromatic fluorothiolformates can be conveniently prepared by reacting carbonyl chlorofluoride with an aromatic compound containing any number of hydroxyl groups or thiol groups, respectively, bonded directly to the aromatic carbon atoms or the sodium or potassium salt of an aromatic hydroxyl-containing compound. The arenol or arenthiol may be further substituted with such groups as halogen, alkyl, haloalkyl, alkoxy, haloalkoxy and the like.

Actually, the reaction can be carried out under many varying conditions. However, the conversion of the arenols and the arenthiols and the yields of the corresponding aromatic fluoroformate were maximized to nearly theoretical values, which is unusual for this type of reaction.

By arenols and arenthiols we mean all hydroxy and thiol containing aromatic compounds in which the hydroxy and thiol groups are linked directly to an aromatic carbon atom.

The reaction is carried out under substantially anhydrous conditions to minimize hydrolysis of the desired fluoroformates and fluorothiolformates. The vessels used for the reaction should be of substantial material as will allow operation at high pressures and moderate temperatures. Provision should be made to remove excess carbonyl chlorofluoride after the reaction is completed. Some form of agitation of the reactants is desirable in order to achieve a more intimate contact. The products of the reaction can be separated by conventional methods of vacuum distillation in the case of liquids, and crystallization in the case of solids.

Carbonyl chlorofluoride, which here is used as a reactant, can be prepared by several methods described in the literature (Emeleus and Wood, J. Chem. Soc. 1948, 2183–8).

The reaction will proceed at atmospheric and superatmospheric pressures. However, the preferred pressure is superatmospheric. An excess of carbonyl chlorofluoride is used to help shift the equilibrium established in the reactor to the desired products and decrease carbonate formation.

The proportion of carbonyl chlorofluoride to arenol or arenthiol is not narrowly critical. The preferred range of reactants is at least 1 mol carbonyl chlorofluoride for each hydroxyl or thiol equivalent present in the aromatic compound. The particularly preferred range is 1 to 2 mol carbonyl chlorofluoride for each hydroxyl or thiol equivalent present in the aromatic compound. An excess of carbonyl chlorofluoride, as stated above, is desirable to decrease the amount of carbonate or dithiolcarbonate formation. The use of an inert solvent, preferably toluene or benzene, was found necessary to increase the yield of arylfluoroformate and likewise decrease carbonate formation.

The purity of the carbonyl chlorofluoride is not critical under the preferred conditions. Carbonyl chlorofluoride containing up to 15% impurities of carbonyl fluoride and carbonyl chloride did not show a marked decrease in arylfluoroformate produced. No chloroformates or carbonate formation was detected which indicates that carbonyl chlorofluoride has a superior reactivity over these two impurity components.

The reaction will proceed with or without a catalyst, although the use of a basic catalyst was found useful in obtaining maximum conversions and yields. In general, any saturated tertiary amine may be used as a catalyst. The preferred tertiary amine for our reactions was tri-n- butylamine. Good results are obtained when using between 1% and 20% catalyst by weight, based on the weight of the arenol or arenthiol used.

The temperature of the reaction is not critical and is kept as low as operability permits. Preferably, the temperature range should be above 0° C. and as high as the arenol or arenthiol used requires, within the given conditions of this invention. Each arenol and arenthiol will have its conditions as to temperature, pressure and reaction time, but will lie within the limits of this invention. In general, the maximum temperature need not be over 150° C.

The sodium or potassium salt of the arenol or arenthiol may be substituted for the free arenol or arenthiol, although the conversion of these compounds to the corresponding arylfluoroformate and arylfluorothiolformate is not as acceptable as that obtained when the free arenol or arenthiol is used.

The following examples illustrate the preparation of the novel compounds of this invention following this procedure.

*Examples 1–7*

An autoclave was charged with 0.1 mol phenol in 50 ml. of toluene and, when a basic catalyst was used, 0.5 ml. tri-n-butylamine. The carbonyl chlorofluoride, 0.2 mol, was then condensed in the autoclave. The autoclave was shaken to agitate the reactants. The following table shows the experimental details and results. The temperature was measured by an external thermocouple. Toluene was used as the solvent in all of the examples in Table I.

TABLE I

| Example | Catalyst | Temp. (deg.) | Time (hrs.) | Pressure (atm.) | Percent Conversion of Phenol | Percent Phenyl fluoroformate | Yields Diphenyl carbonate |
|---------|----------|--------------|-------------|-----------------|------------------------------|------------------------------|---------------------------|
| 1 |           | 40 | 12 | 1    | 2.3  | 100  |       |
| 2 | N(But)$_3$ | 40 | 12 | 1    | 6.2  | 100  |       |
| 3 | N(But)$_3$ | 70 | 12 | 1    | 23.4 | 100  |       |
| 4 |           | 80 | 12 | 1    | 10.2 | 100  |       |
| 5 |           | 80 | 12 | 19.1 | 77.1 | 54.3 | 45.7  |
| 6 |           | 35 | 12 | 15   | 24.2 | 100  |       |
| 7 | N(But)$_3$ | 50 | 12 | 20.4 | 97.2 | 99.4 | 0.1   |

The reaction mixture in each case was worked up by removal of the solvent first. Then the impure product was vacuum distilled to obtain the purified phenylfluoroformate. The phenylfluoroformate had a boiling point of 47.1° C. at 7 mm. Hg. The elemental analysis was close to the theoretical values. Other physical properties, refractive index 1.4642 at 26.5° C. and density 1.201 at 23.8° C.

The infrared spectra of phenylfluoroformate and the phenylchloroformate were run. A comparison showed the theoretically expected shift of the C=O vibration in the fluorine compound to higher frequencies and addition C—F vibration and the elimination of the C–Cl vibration. The $F^{19}$ nuclear magnetic resonance spectrum of the product showed one singlet at 16.5 p.p.m. (CCl$_3$F as the internal standard), which we have found to be the expected absorption region for the fluorine in this class of compounds.

*Example 8*

In a similar procedure as the examples above, sodium-phenolate (0.1 mol) and carbonyl chlorofluoride (0.2 mol) were reacted. The reaction was run in toluene as a solvent. A pressure of 20.2 atm., autogenous pressure, was developed in the shaking autoclave. The autoclave was heated to 50° C. for 12 hours.

The conversion of sodium phenolate was 13.6%, the yield of phenylfluoroformate was 100%. The reaction mixture was worked up by distillation in vacuo. The phenylfluoroformate was characterized in the manner described in Examples 1–7.

*Example 9*

A 150 ml. stainless steel reaction bottle was charged with 0.1 mol thiophenol in 50 ml. of benzene, and 0.5 ml. of tri-n-butylamine was used as a catalyst. Carbonyl chlorofluoride (0.2 mol) was condensed in the vessel. The reaction bottle was closed by means of a valve and heated to 50° C. while being shaken on a shaking table. At the end of 12 hours the conversion of the starting material thiophenol was 100% and the yield of phenylfluorothiolformate was 100%.

The phenylfluorothiolformate was purified by vacuum distillation. It distilled at 73° C. at 9 mm. Hg.

The elemental analysis was: C, 53.85% theoretical, 53.59% found; H, 3.22% theoretical, 3.39% found; S, 20.51% theoretical, 20.42% found. The compound was a colorless liquid with a pungent odor. Other physical properties, refractive index 1.5273 at 24° C. and density 1.223 at 24° C.

Nuclear magnetic resonance studies showed for $F^{19}$ a singlet at −43.6 p.p.m. (CFCl$_3$ internal standard) and for protons the usual aromatic absorption at −455 p.p.m. (TMS internal standard). Infrared investigation produced the expected vibrations for the phenylfluorothiolformate.

*Example 10*

In the same manner as the above examples, hydroquinone was treated with carbonyl chlorofluoride in an autoclave at 60° C. in toluene as a solvent and using 5% tri-n-butylamine as a catalyst. The autoclave was shaken for 15 hours and an autogenous pressure of 250 p.s.i. developed. The product was recrystallized from hexane, after removal of the solvent in vacuo.

The conversion of hydroquinone was 99.9% and the yield of p-phenylene-bis-fluoroformate was 99.9%. Recrystallization yielded a white crystalline compound with a melting point of 67–68° C. The molecular weight was found to be 208 as compared to the theoretical 202.

Nuclear magnetic resonance and infrared investigations were used to confirm the expected structure.

*Example 11 and 12*

The procedure of Example 9 is equally applicable to m-dihydroxy benzene and o-dihydroxy benzene. In the same manner at 80 to 90° C. a 94.5% yield of m-phenylene-bis-fluoroformate was obtained. The conversion of starting material was 100%. The meta compound was purified in vacuo and exhibited a boiling point of 67° C. at 1 mm. Hg. The refractive index was 1.4563 at 22° C. and density 1.412 at 23° C.

The analysis: C, theory 47.5%, found 47.7%; H, theory 1.98%, found 2.29%, and F, theory 18.9% found 18.7%.

The bifunctional ortho compound was somewhat more difficult to prepare, since the formation of the intramolecular carbonate was favored. By varying the conditions and reactants used it was possible to reach a maximum yield of ortho phenylene-bis-fluoroformate at 47.7°. The most favorable temperature was 20° C. using triethylamine as a catalyst.

The ortho-phenylene-bis-fluoroformate was a colorless lachrymatory liquid with a boiling point of 77° C. at 7 mm. Hg. Nuclear magnetic resonance and infrared analysis confirmed the expected compound.

Example 13

In the same manner as the previous examples, p-trifluoromethylphenol and carbonyl chlorofluoride were reacted in toluene with 5% tri-n-butylamine as a catalyst. The conversion of the starting material was 99.0% and the yield of p-$CF_3$—$C_6H_4$—OCOF was 100%.

The properties are B.P. 68° C. at 25 mm. Hg, refractive index 1.4151 at 25.5° C. and density 1.390 at 24° C.

Analysis for the compound: Calculated, 46.16% C, 36.55% F, 1.82% H; Found, 46.21% C, 36.6% F, 1.96% H. Infrared analysis presented the expected spectrum. Investigation by $F^{19}$ nuclear magnetic resonance showed an absorption, a singlet, at +16.8 p.p.m. typical for the —OCOF group and a singlet at +63.7 p.p.m. typical for the —$CF_3$ group ($CFCl_3$ used as an internal standard).

Example 14

Following a similar procedure as outlined in the above examples, the reaction was carried out between p-bromophenol and carbonyl chlorofluoride in toluene as a solvent with a small amount of tri-n-butylamine catalyst. Conversion of the starting material was 100%; yield of p-Br-$C_6H_4$—OCOF was 99.9%.

The compound can be characterized by the following properties: colorless liquid, B.P. 72.5° at 6 mm. Hg, refractive index 1.5170 at 23.8° C., density 1.657 at 24° C.

Analysis.—Theory, 38.36% C, 1.83% H, 8.68% F, 36.53% Br; Found, 38.47% C, 1.97% H, 8.80% F, 36.80% Br. The compound was further characterized by its infrared and nuclear magnetic resonance spectra.

Example 15

According to the procedure of the previous examples, p-methoxyphenol and carbonyl chlorofluoride were reacted to prepare p-methoxyphenylenefluoroformate.

Properties: colorless liquid, B.P. 51° C. at 1 mm. Hg, refractive index 1.4843 at 23° C., density 1.252 at 24° C.

Analysis.—Theory, 56.47% C, 4.12% H, 11.18% F. Found: 57.34% C, 4.14% H, 11.3% F.

Example 16

According to the procedure of the previous examples, p-methylphenol and carbonyl chlorofluoride were reacted to prepare p-methylphenylenefluoroformate.

Properties: colorless liquid, B.P. 70° C. at 1 mm. Hg, refractive index 1.4663 at 24° C., density 1.143 at 24.8° C.

Analysis.—Theory, 62.34% C, 4.55% H, 12.34% F. Found: 62.32% C, 4.51% H, 11.8% F.

Example 17

According to the procedure of the previous examples, α-naphthol and carbonyl chlorofluoride were reacted to prepare α-naphthylfluoroformate.

Properties: colorless liquid, B.P. 80° C. at 1 mm. Hg, refractive index 1.5662 at 24° C., density 1.251 at 24.5° C.

Analysis.—Theory, 69.47% C, 3.68% H, 10.00% F. Found: 69.36% C, 3.67% H, 9.7% F.

Example 18

According to the procedure of the previous examples, p-fluorophenol and carbonyl chlorofluoride were reacted to prepare p-fluorophenylenefluoroformate.

Properties: colorless liquid, B.P. 52° C. at 15 mm. Hg, refractive index 1.4490 at 23.5° C., density 1.304 at 24.8° C.

Analysis.—Theory, 53.17% C, 2.54% H, 24.05% F. Found: 53.00% C, 2.47% H, 23.8% F.

Example 19

According to the procedure of the previous examples, o-bromophenol and carbonyl chlorofluoride were reacted to prepare o-bromophenylenefluoroformate.

Properties: colorless, disagreeable smelling liquid, B.P. 66° C. at 4.55 mm. Hg. Refractive index 1.5110 at 22° C., density 1.610 at 23.5° C.

Analysis.—Theory, 38.36% C., 1.83% H, 36.53% Br, 8.68% F. Found: 38.62% C, 1.92% H, 36.96% Br, 7.8% F.

Example 20

According to the procedure of the previous examples, o-fluorophenol and carbonyl chlorofluoride were reacted to prepare o-fluorophenylenefluoroformate.

Properties: colorless liquid, B.P. 33–34° C. at 6.55 mm. Hg. Refractive index 1.4434 at 23° C., density 1.275 at 24° C.

Analysis.—Theory, 52.83% C, 3.14% H, 23.90% F. Found: 53.45% C, 2.96% H, 23.8% F.

Example 21

According to the procedure of the previous examples, 1,3,5-trihydroxybenzene and carbonyl chlorofluoride were reacted to produce 1,3,5-phenenyl-trisfluoroformate.

Properties: white crystalline compound, M.P. 92° C. Analysis.—Theory, 40.91% C, 1.14% H, 21.59% F. Found: 41.23% C, 1.37% H, 21.50% F.

Various changes and modifications may be made in the process described herein as will be apparent to those skilled in the chemical arts. It is accordingly intended that the present invention only be limited by the scope of the appended claims.

We claim:
1. The compound, phenylfluorothiolformate.
2. The compound, p-phenylene-bis-fluoroformate.
3. The compound, p-bromophenylfluoroformate.
4. The compound, 1,3,5-phenenyltrisfluoroformate.
5. The compound, α-naphthylfluoroformate.
6. A process for producing substituted aromatic compounds selected from the group consisting of phenyl and naphthyl compounds having at least one substituent selected from the group consisting of fluoroformyl (—OCOF) and fluorothioformyl (—SCOF) comprising contacting carbonyl chlorofluoride with a substituted aromatic compound selected from the group phenyl and naphthyl having at least one substituent selected from the group consisting of hydroxyl, thiol, and the alkali metal salts thereof at a temperature range of about 0° C. to 150° C.
7. The process defined in claim 6, wherein the reaction is carried out at superatmospheric pressure.
8. The process defined in claim 6 wherein the reaction is carried out in the presence of a saturated tertiary amine.
9. The process defined in claim 6 wherein the reaction is carried out at superatmospheric pressure in the presence of a saturated tertiary amine.

References Cited

UNITED STATES PATENTS 2,351,366  6/1944  Pohl et al. _____ 260—455
2,721,208  10/1955 Losee et al. _____ 260—463

OTHER REFERENCES

Emeleus et al.: Chemical Society Journal (London) (1948), part III, pp. 2183–2188.

Yarovenkeno et al.: Chemical Abstracts 1960, vol. 54, p. 19479.

CHARLES B. PARKER, Primary Examiner.

JOSEPH P. BRUST, Examiner.

DALE MAHANAND, DELBERT R. PHILLIPS, Assistant Examiners.